United States Patent [19]

Conover

[11] 4,425,722

[45] Jan. 17, 1984

[54] APPARATUS FOR REMOVING STAKES FROM THE GROUND

[76] Inventor: Clarence G. Conover, 304 Wendi La., Ruskin, Fla. 33570

[21] Appl. No.: 424,246

[22] Filed: Sep. 27, 1982

[51] Int. Cl.³ .................. A01B 13/00; A01D 57/00
[52] U.S. Cl. .................................. 37/2 P; 171/61;
171/38; 254/30
[58] Field of Search ............... 37/2 R, 2 P, DIG. 3;
171/38, 58, 61; 254/30, 199, 213–215, 225–227

[56] References Cited

U.S. PATENT DOCUMENTS

| | | | |
|---|---|---|---|
| 2,433,477 | 12/1947 | O'Quinn et al. | 254/30 |
| 3,330,363 | 7/1967 | Greedy | 171/61 |
| 3,854,083 | 9/1974 | Wetzel | 171/61 |
| 3,898,752 | 8/1975 | Ulue | 37/2 R |
| 4,263,972 | 4/1981 | Johnson | 171/61 |

Primary Examiner—E. H. Eickholt
Attorney, Agent, or Firm—Frijouf, Rust & Pyle

[57] ABSTRACT

An apparatus is disclosed which is mountable upon a tractor for removing stakes from the ground and for collecting the stakes. The apparatus includes a support framework and a stake loosening means disposed on the framework. The stake loosening means includes a plurality of stake loosening fingers for loosening the stakes relative to the ground. The loosened stakes are removed from the ground by counterrotating rollers which define a stake receiving passage therebetween. The stakes are guided from the counterrotating rollers by means of a stake guiding chute having an input and an output end with the output end being disposed adjacent a stake collecting means.

21 Claims, 11 Drawing Figures

APPARATUS FOR REMOVING STAKES FROM THE GROUND

BACKGROUND OF THE INVENTION

1. Field of the Invention

This invention relates to an apparatus for removing stakes from the ground and for collecting the stakes.

2. Description of the Prior Art

With the advent of ever-increasing mechanization in agriculture, a problem has existed with regard to the collection of tomato and like plant stakes at the end of the growing season. Up until recently the task of pulling such stakes from the ground and collecting the stakes for storage has been a laborious and time-consuming operation. Usually the tomato grower has been in the custom of hiring casual labor to perform this task and such workers have been in the habit of breaking many stakes. The replacement of the broken stakes results in an increase in operating expense on the part of the grower. In addition to this expense, it is estimated that the average cost per acre for removal of the stakes is $50.00. While this cost may not appear excessive when initially considered, it should be borne in mind that, for example in the State of Florida alone, over 35,000 acres of land are utilized for the growing of fresh market tomatoes. From the above, it is clear that approximately one and three-quarter million dollars are spent per growing season in the State of Florida on the task of removing stakes from the ground. On the level of the individual grower, it is not unusual for a grower to use upwards of a million stakes per growing season. Each tomato stake is of wood and measures approximately $4' \times 1'' \times \frac{3}{4}''$ (122 centimeters $\times$ 2.5 centimeters by 1.9 centimeters). Thus even with a 5% breakage rate, the grower must replace 50,000 stakes at a considerable cost to the grower.

In an attempt to overcome the above problems, mechanized apparatus have been proposed. This mechanization has to an extent alleviated the problem. One such apparatus is disclosed in U.S. Pat. No. 4,263,972 to Johnson. This apparatus includes essentially a pair of cooperating counterrotating conveyor belts which are inclined relative to the ground such that tomato stakes grasped between the cooperating belts are progressively eased upwards from the ground. At the upper end of the belts the removed stakes are transferred by means of a relatively complex mechanism to a collection bin. With the foregoing arrangement, the forward speed of the apparatus relative to the row of stakes to be removed governs the speed with which the cooperating belts rotate. If this were not so, the stakes would be bent forward in the event of the belts being driven too slowly or would be bent backwards in the event of the belts being driven too quickly. In either event, breakage of the stakes could result unless the speed of the belts is precisely adjusted to coincide with the forward speed of the apparatus.

If the above-disclosed apparatus were adapted to be attached to a tractor or like traction machine, it would be necessary to provide a complex transmission device from the tractor to the cooperating belt guide means or to have a complex ground speed sensing device to govern the speed of rotation of the belts.

U.S. Pat. No. 2,239,458 to Hetzel, discloses an apparatus for digging potatoes from the ground and separating the potatoes from the stems and leaves.

U.S. Pat. No. 3,473,614 to Kemp describes a machine for separating the stem and leaves of carrots from the root by means of counterrotating rollers and an overhead conveyor.

In view of the above, a need has existed for an apparatus for removing stakes from the ground that operates entirely independent from the speed at which the apparatus moves forward relative to the row of stakes. Although with particular reference to U.S. Pat. No. 4,263,972 a machine has been disclosed for performing the operation of removing tomato stakes from the ground and collecting the stakes, there has been a need among tomato growers for a simple apparatus having its own power source that can be mounted upon a tractor or like traction machine that will operate satisfactorily regardless of the forward speed of the tractor relative to the row of stakes.

Therefore it is the primary object of this invention to provide an apparatus that overcomes the aforementioned inadequacies of the prior art apparatus and provides an improvement which significantly contributes to the ease with which stakes can be removed and collected from the ground regardless of the type of tractor on which the apparatus is mounted or the speed with which the tractor moves relative to the ground.

Another object of this invention is to provide an apparatus for removing agricultural stakes from the ground and collecting the same in which loosening fingers loosen the stake relative to the ground prior to the removal of the stake therefrom.

Another object of this invention is to provide an apparatus for removing agricultural stakes from the ground including a pair of counterrotating rollers which transport the loosened stake from the ground.

Another object of this invention is to provide an apparatus of the aforementioned type having a stake guiding chute for guiding the stakes impelled by the rollers towards a spring biased means which rebounds the stakes to an output end of the chute.

The foregoing has outlined some of the more pertinent objects of the present invention. These objects should be construed to be merely illustrative of some of the more pertinent features and applications of the invention. Many other beneficial results can be obtained by applying the disclosed invention in a different manner or modifying the invention within the scope of the disclosure particularly with regard to the use of the invention disclosed herein. This should not be construed as limited to apparatus for removing and collecting agricultural stakes from the ground but should include the removal of other stakes such as fencing stakes and the like.

SUMMARY OF THE INVENTION

The apparatus of the present invention is defined by the appended claims with specific embodiments shown in the attached drawings. For the purpose of summarizing the invention, the invention relates to an apparatus for removing stakes or similar articles from the ground and collecting the stakes or similar articles. The apparatus comprises a support framework mountable upon a tractor. A stake loosening means disposed on the framework. The loosening means includes a plurality of stake loosening fingers which loosen the stakes relative to the ground. The loosened stakes are transported by counterrotating rollers supported on the framework and disposed adjacent the loosening fingers. The stakes are received by a stake receiving passage defined by the counterrotating rollers. A stake guiding chute, having an input end adjacent the rollers receives the stakes from the rollers with the chute guiding the stakes to an output end.

In a more specific embodiment of the invention, the stake loosening means includes a pair of arms with each arm having a plurality of fingers. The distal ends of the fingers of one arm lies adjacent the distal ends of the fingers of the other arm with the ends defining a tortuous path for the passage of the stakes therebetween.

More specifically, the arms of the loosening means are parallel to each other and lie in the same plane as the loosening fingers. Additionally, the respective axes of rotation of the rollers lie in a plane substantially parallel to the plane of the arms and fingers. Furthermore the rollers are tapered and define a stake receiving passage therebetween which is widest adjacent the stake loosening means.

In a specific embodiment of the invention, two pairs of rollers transport the stake from the ground. One of the rollers is driven and this first roller of the first pair of rollers drives a second roller of the first pair of rollers. The second roller of the first pair in turn drives the second roller of a second pair of rollers. The first roller of the first pair additionally drives the first roller of the second pair of rollers. Thus each roller within a pair of rollers is rotated in the opposite direction to the other roller within that pair of rollers. The stake guiding chute includes an input end which receives the stakes from the counterrotating rollers. The stakes are guided within the chute along a first trajectory to strike a spring-biased means which rebounds the stakes along a second trajectory such that the stakes are ejected at an output end of the chute into a collecting means. An impeller disposed on the framework includes a driven wheel having radially extending arms for impelling the stakes from the tortuous path to the stake receiving passage.

The foregoing has outlined rather broadly the more pertinent and important features of the present invention in order that the detailed description of the invention that follows may be better understood so that the present contribution to the art can be more fully appreciated. Additionally, features of the present invention will be described hereinafter which form the subject of the claims of the invention. It should be appreciated by those skilled in the art that the conception and specific embodiments disclosed may be readily utilized as a basis for modifying or designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the present invention, reference should be had to the following detailed description taken in connection with the accompanying drawings in which.

Similar reference characters refer to similar parts throughout the several views of the drawings.

DETAILED DESCRIPTION

Figure 1:
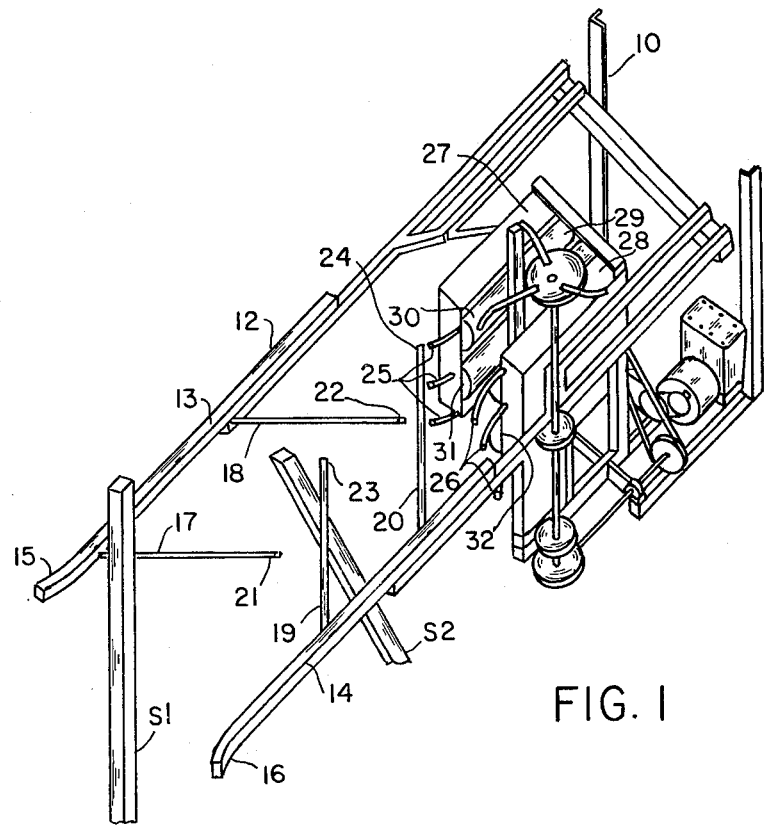
FIG. 1 is an isometric view of the apparatus for removing stakes from the ground.

FIG. 1 is an isometric view of an apparatus for removing stakes S1 such as agricultural stakes or the like from the ground and collecting the stakes. The apparatus includes a framework generally designated 10 which can be secured by any suitable means to a tractor or like traction device (not shown). A stake loosening means generally designed 12 is secured to the framework 10 and includes two substantially parallel arms 13 and 14. The distal ends 15 and 16 of arms 13 and 14 respectively are bent outwardly relative to each other. A plurality of stake loosening fingers 17 and 18 disposed on arm 13 extend inwardly and rearwardly towards the other arm 14. Arm 14 similarly has a plurality of stake loosening fingers 19 and 20 disposed thereon also extending inwardly and rearwardly towards arm 13. The disposition of the fingers 17 and 18 are staggered relative to the disposition of fingers 19 and 20 so that the respective distal ends 21, 22, 23 and 24 of fingers 17, 18, 19 and 20 define a tortuous path for the passage of an upright stake S1 therebetween.

Figure 2:
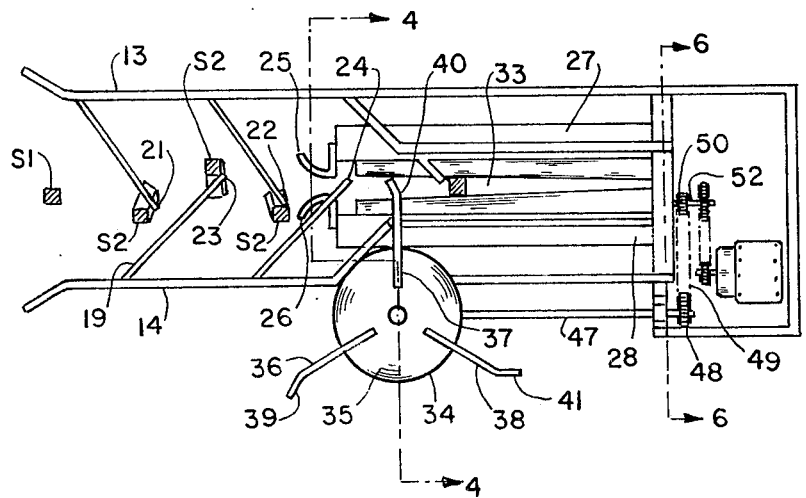
FIG. 2 is a top plan view of the apparatus shown in FIG. 1

Forward motion of the stake loosening and removing apparatus will centralize the stake S1 between guide arms 13 and 14 as the stake S2 reacts progressively with the fingers 17, 19, 18 and 20. As the stake S2 reaches the distal end 21 of finger 17, the stake will be tilted forwardly and towards the arm 14. Next, reaction between the stake S2 and finger 19 will still tend to tilt the stake forwardly but will tilt the stake towards arm 13. In this manner, as the stake passes the distal ends 21, 23, 22 and 24 respectively, the stake will be tilted slightly from one side to the other in an alternate loosening motion relative to the ground. The stake in the loosened condition is designated as S2 and is guided by two sets of guides 25 and 26 disposed on roller support housings 27 and 28 respectively. The roller housing 27 supports two tapered rollers 29 and 30 and the housing 28 supports two tapered rollers 31 and 32. The pair of rollers 30 and 32 form a pair which are driven in counterrotation relative to each other and similarly the pair of rollers 29 and 31 rotate in opposite directions relative to one another. The drive means of the respective rollers is such that rollers 29 and 30 rotate in the same direction. Rollers 31 and 32 rotate in the same direction as each other, but in the opposite direction to rollers 29 and 30. The two pairs of rollers 29, 31 and 30, 32 define therebetween a stake receiving passage 33 shown more particularly in FIG. 2. The passage 33 is tapered, being widest towards the stake loosening means. As the stake is guided by the two sets of guides 25 and 26 into passage 33, counterrotation of the pair of rollers 30 and 32 forcibly urge the stake vertically relative to the ground. Similarly, the other pair of rollers 29 and 31 also urge the stake upwardly into the input end 72 of guide chute 70 to be described hereinafter. As described hereinbefore, the stake loosening fingers tend to tilt the stake S2 forwardly relative to the ground and in order to restore the loosened stake S2 to a vertical position as it enters passage 33 an impeller, generally designated 34, is disposed on the framework 10 to impel the stake S2 back into a vertical position within the passage 33. The impeller 34 includes a wheel 35 having three radially extending arms 36, 37, and 38 disposed thereon. The distal ends of the arms 36, 37, and 38 are bent slightly so that the bent portions 39, 40 and 41 of arms 36, 37 and 38 respectively, guide the stake S2 into a vertical position within the passage 33 when the wheel 35 is rotated in a clockwise direction as viewed in FIG. 2. The wheel 35 is mounted upon an axle 42 which is rotatably supported in bearing blocks 43 and 44 which are secured to the framework 10. A driven disc 45 is disposed at the other end of the axle 42. The disc 45 is driven by a wheel 46 disposed at the end of a horizontal shaft 47 which is driven by means of a sprocket 48 and cooperating chain 49 which is driven from sprocket 50 rigidly secured to the input shaft of the roller drive mechanism.

Figure 3:
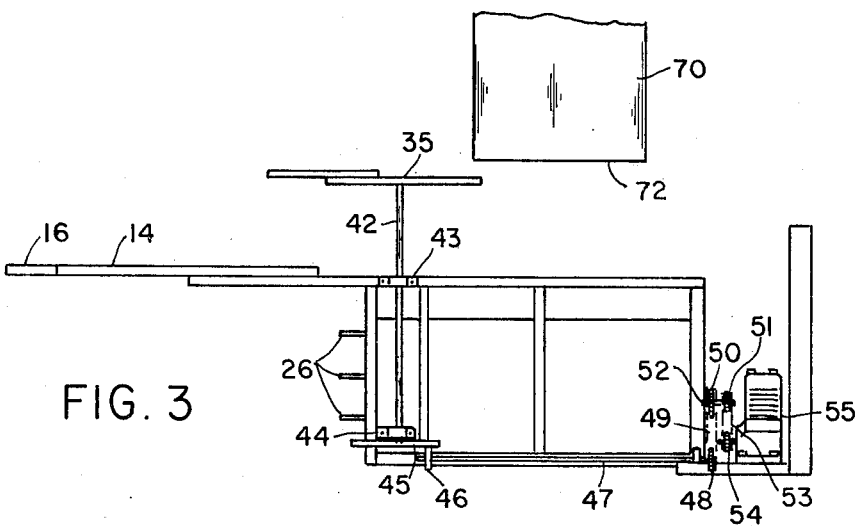
FIG. 3 is a side elevational view of the apparatus of FIG. 1 showing the location of the guide chute.

As shown in FIG. 3, sprocket 50, which drives impeller 34 and tapered roller 32, is driven by means of a sprocket 51 disposed on the shaft 52 of roller 32. The sprocket is driven by a chain drive 53 which is driven by sprocket 54 which is keyed to the crank shaft of a suitable motor or engine 55 disposed in the framework 10.

Figure 4:
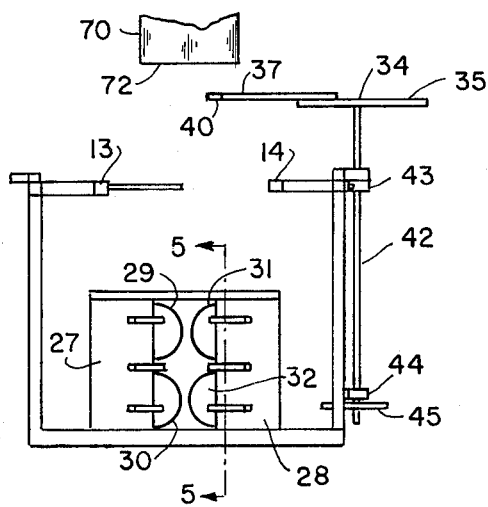
FIG. 4 is a sectional view taken on line 4—4 of FIG. 2.
Figure 5:
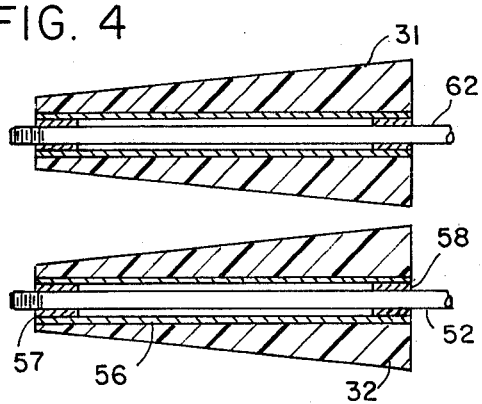
FIG. 5 is a sectional view taken on line 5—5 of FIG. 4.

FIG. 5 is an enlarged cross-sectional view of line 5—5 of FIG. 4 and shows the tapered roller 32 having an internal sleeve 56 rigidly mounted by spacing sleeves 57 and 58 on shaft 52.

Figure 6:
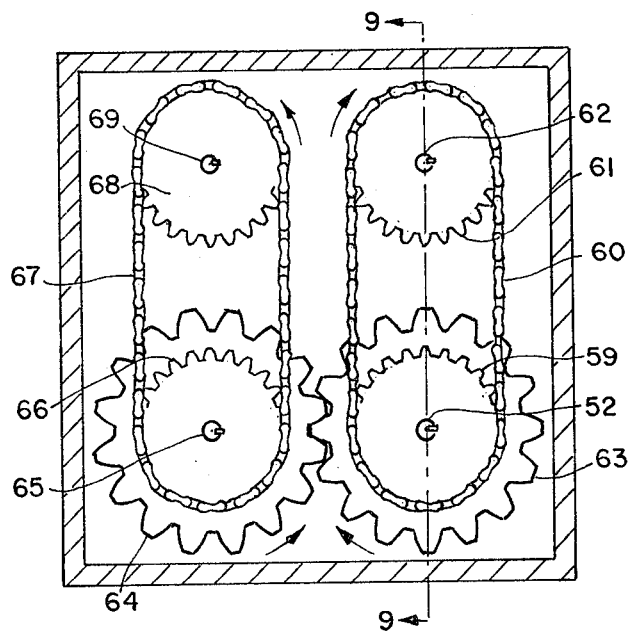
FIG. 6 is an enlarged sectional view of the gear box taken on line 6—6 of FIG. 2.

As shown more particularly in FIG. 6, shaft 52 which is driven by a motor 55 has rigidly secured thereto a drive sprocket 59. The drive sprocket 59 drives a chain 60 about a sprocket 61. Sprocket 61 is rigidly secured to a shaft 62 on which is rigidly mounted tapered roller 31. When the shaft 52 is driven in a clockwise direction as viewed in FIG. 6, the rollers 32 and 31 will be driven in a clockwise direction. A cog 63 is also rigidly mounted on the shaft 52 and this cog 63 meshes with cog 64 rigidly mounted on shaft 65. A sprocket 66 rigidly disposed on shaft 65 drives sprocket 68 by chain drive 67. Sprocket 68 is rigidly disposed on a shaft 69 so that on rotation of shaft 52 in a clockwise direction, cog 64 will be driven in a counterclockwise direction. In this manner the tapered rollers 29 and 30 are both driven in a counterclockwise direction as viewed in FIG. 6.

When a stake S2 is inserted between the passage 33 the four tapered rollers 29, 30, 31 and 32 forcibly urge the stake S2 vertically relative to the ground into the input end of guide chute 70. The guide chute generally designed 70 is shown more particularly in FIGS. 10 and 11 and includes an elongated tube 71 of rectangular cross-section having an input end 72 disposed adjacent to and vertically above the passage 33. The elongated tube 71 has a connecting means 73 adapted to receive an extension tube 74. One wall of the tube 74 has an internal protuberation 75. A spring-biased means 76 is housed within the extension tube 74 at the end of tube 74 remote from the connecting means 73. The elongated tube 71 has disposed thereon a junction tube 77 which is joined to the tube 71 and which has a stake output end 78.

Figure 10:
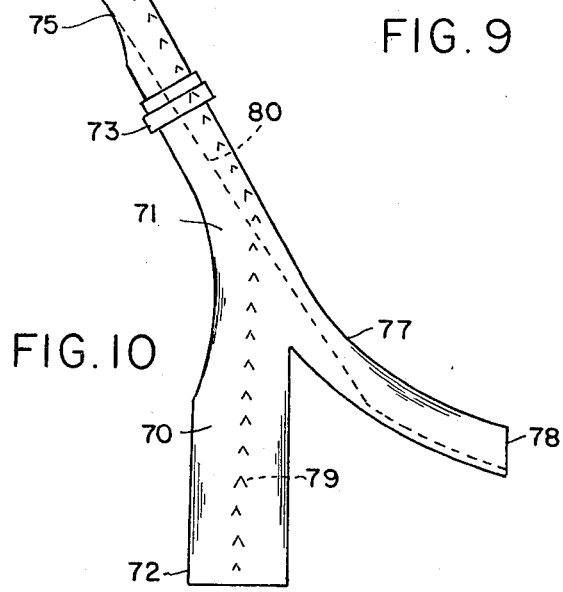
FIG. 10 is a side elevational view of the guide chute of the present invention.

In the operation of the guide chute, a stake is forcibly urged upwards from the ground into elongated tube 71 along a trajectory 79 as shown in FIG. 10. This stake is guided along the tube 71 past the connection 73 into the extension tube 74. The stake strikes the spring-biased means 76 which rebounds the stake down the tube 74 along a trajectory 80 so that the stake strikes the protuberation 75 which deflects the stake back through the connecting means 73 into the junction tube 77 where it is guided out of the chute via the output end 78.

Figure 11:
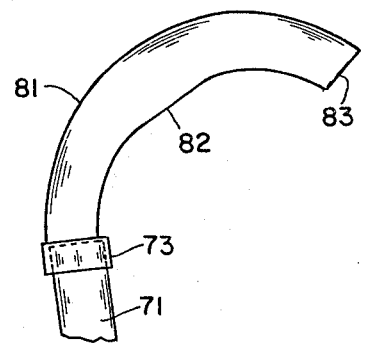
FIG. 11 is an alternative embodiment of an attachment for the guide chute.

In an alternative embodiment of the guide chute 70 as shown in FIG. 11, the extension tube 81, which is connected to the elongated tube 71 by connecting means 73, is of a curved configuration. One wall 82 of the extension tube 81 is enlarged to allow the passage of a stake therethrough. In the alternative guide chute, a stake entering tube 71 will pass through connecting means 73 and will be guided around by the extension tube 81 to the output end 83.

Figure 7:
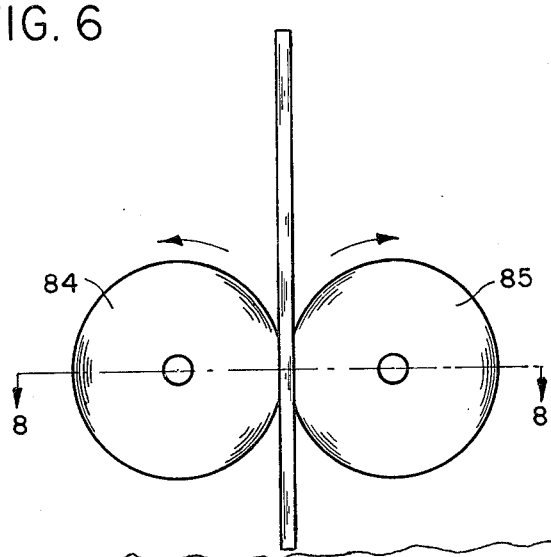
FIG. 7 is a front elevational view of an alternative embodiment of the present invention.
Figure 8:
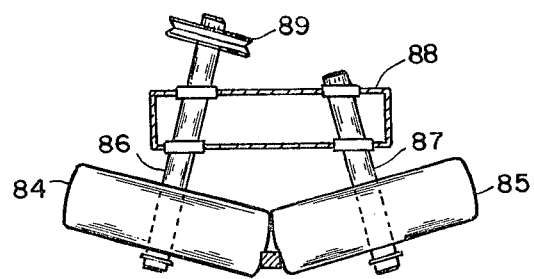
FIG. 8 is a sectional view of the alternative embodiment taken on line 8—8 of FIG. 7.
Figure 9:
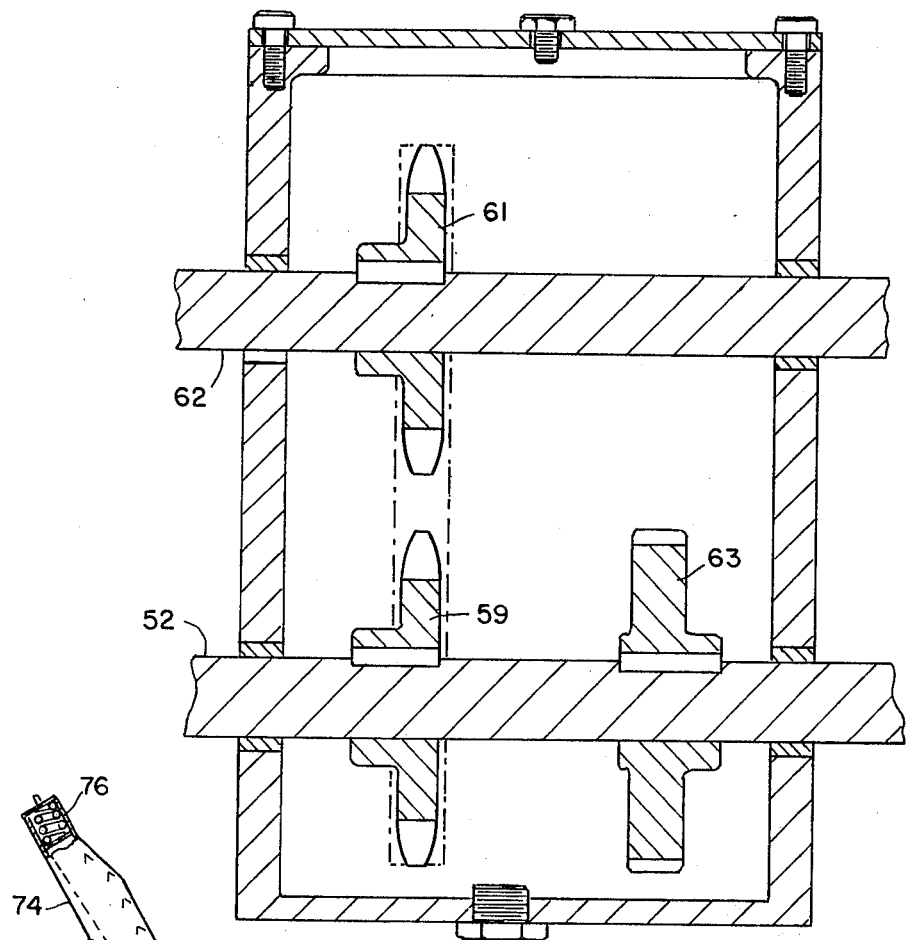
FIG. 9 is a sectional view taken on line 9—9 of FIG. 6.

FIG. 9 is an enlarged cross-section taken on line 9—9 of FIG. 6 and shows in more detail the layout of the various sprockets and cogs. FIGS. 7 and 8 show an alternative embodiment of the present invention in which a pair of rubber tires 84 and 85 are rigidly mounted on shafts 86 and 87 respectively. The shafts 86 and 87 are rotatably disposed on a housing 88 which is secured to the framework 10. Shaft 86 is driven by the motor 55 via a pulley 89. When pulley 89 is driven by motor 55, shaft 86 will rotate. Rotation of the shaft 86 will rotate the tire 84 which being in contact with one edge of the tread of the tire 85, will cause the tire 85 to rotate in the opposite direction to the tire 84. In this arrangement, a loosened stake S2 guided between the tires 84 and 85 will be forcibly urged upwards into the input end of the guide chute 70.

In the alternative embodiment of FIGS. 7 and 8, the tires 84 and 85 and the various shafts and drive means replace the tapered rollers and gearing of the embodiment described herein before but the rest of the apparatus, including the stake loosening means, the impeller and the chute, remain the same. More specifically, the tires may be of the following size: $16'' \times 7.5'' \times 8''$.

An important feature of the present invention is the provision for removing agricultural stakes from the ground and collecting the same in which the apparatus will operate independently of the speed at which the tractor moves relative to the ground. The present disclosure includes that contained in the appended claims as well as that of the foregoing description. Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for removing stakes or the like from the ground and for collecting the same, comprising in combination:

a support framework;

a stake loosening means disposed on said support framework for loosening said stakes relative to the ground;

said stake loosening means including a plurality of stake loosening fingers;

a first pair of counterrotating rollers rotatably supported on said framework and disposed adjacent said stake loosening fingers for removing said loosened stakes from the ground;

said counterrotating rollers defining therebetween a stake receiving passage; and a stake guiding chute having an input end disposed adjacent said counterrotating rollers and an output end.

2. An apparatus for removing stakes from the ground as set forth in claim 1, wherein said stake loosening means includes a pair of arms, each arm having a plurality of fingers;

the distal ends of the fingers of one arm lying adjacent the distal ends of the fingers of the other arm;

said ends defining a tortuous path for the passage of a stake therebetween; and said ends loosening said stake relative to the ground.

3. An apparatus for removing stakes from the ground as set forth in claim 1, wherein said stake loosening means includes a pair of parallel arms, each arm having a plurality of fingers;

the distal ends of the fingers of one arm lying adjacent the distal ends of the fingers of the other arm;

said ends defining a tortuous path for the passage of a stake therebetween; and said ends loosening said stake relative to the ground.

4. An apparatus for removing stakes from the ground as set forth in claim 1, wherein said stake loosening means includes a pair of parallel arms, each arm having a finger extending therefrom;

the distal ends of the respective fingers defining a tortuous path from the passage of a stake therebetween;

said ends loosening said stake relative to the ground; and said arms and said fingers all lying in the same plane.

5. An apparatus for removing stakes from the ground as set forth in claim 4, wherein the respective axis of rotation of said counterrotating rollers lie in a plane substantially parallel to the said plane of said arms and said fingers.

6. An apparatus for removing stakes from the ground as set forth in claim 5, wherein a second pair of counterrotating rollers is disposed adjacent said first pair of rollers;

said second pair of rollers having respective axis of rotation substantially parallel to the axes of rotation of said first pair of rollers.

7. An apparatus for removing stakes from the ground as set forth in claim 6, wherein each roller of said first and said second pair of counterrotating rollers is tapered.

8. An apparatus for removing stakes from the ground as set forth in claim 7, wherein said stake receiving passage is widest adjacent said stake loosening means.

9. An apparatus for removing stakes from the ground as set forth in claim 6, wherein a gear box is disposed adjacent said first and said second pair of rollers;

said gear box being disposed on a side of said first and said second pair of rollers remote from said stake loosening means.

10. An apparatus for removing stakes from the ground as set forth in claim 9, wherein said gear box includes a driven means for driving a first roller of said first pair of rollers;

said first roller of said first pair of rollers driving a second roller of said first pair of rollers;

said second roller of said first pair of rollers driving a second roller of a second pair of rollers; and said first roller of said first pair of rollers also driving a first roller of said second pair of rollers.

11. An apparatus for removing stakes from the ground as set forth in claim 6, wherein guide means are disposed adjacent said first and said second pair of rollers for guiding said stakes from said tortuous path to said stake receiving passage.

12. An apparatus for removing stakes from the ground as set forth in claim 1, wherein said input end of said stake guiding chute receives stakes impelled by said first pair of rollers;

said stakes being impelled within said chute along a first trajectory to strike a spring-biased means for rebounding said stakes along a second trajectory such that the stakes are ejected from said output end.

13. An apparatus for removing stakes from the ground as set forth in claim 1, wherein said chute guides said stakes from said input end of said chute to said output end of said chute, the width of the chute being widened at the curvature of the chute to enable said stakes to pass therethrough.

14. A powered mobile apparatus for removing stakes from the ground and for collecting the same, comprising in combination;

a support framework;

a stake loosening means disposed on said support framework;

said stake loosening means including a pair of arms defining a passageway therebetween for said stakes;

a stake loosening finger disposed on each of said arms and extending therefrom within said passageway;

the distal ends of said fingers defining a tortuous path for the passage of said stakes therebetween;

a pair of counterrotating rollers rotatably supported on said framework and disposed adjacent said tortuous path for transporting said stakes from the ground;

said counterrotating rollers defining therebetween a stake receiving passage;

a stake guide chute including an input end disposed adjacent said counterrotating rollers and an output end; and a collecting means for collecting said stakes from said output end of said stake guiding chute.

15. A powered mobile apparatus for moving stakes from the ground as set forth in claim 14, wherein said pair of arms are substantially parallel.

16. A powered mobile apparatus for moving stakes from the ground as set forth in claim 14, wherein said fingers and said arms lie in the same plane.

17. A powered mobile apparatus for moving stakes from the ground as set forth in claim 14, wherein said stake receiving passage defined by said rollers is tapered, being widest adjacent said tortuous path.

18. A powered mobile apparatus for moving stakes from the ground and for collecting the same, comprising in combination;

a support framework;

a stake loosening means disposed on said support framework;

said loosening means including a pair of substantially parallel arms defining therebetween a passageway for the passage of said stakes;

a stake loosening finger disposed on each of said arms and extending therefrom within said passageway;

said fingers and said arms all lying in the same plane;

the distal ends of said fingers defining a tortuous path for the passage of said stakes;

a pair of counterrotating rollers rotatably supported on said framework and disposed adjacent said tortuous path for transporting said stakes from the ground;

said counterrotating rollers defining therebetween a stake receiving passage;

a stake impeller for guiding said stakes from said tortuous path to said stake receiving passage;

a stake guide chute including an input end disposed adjacent said counterrotating rollers and an output end; and a collecting means for collecting said stakes from said output end of said stake guiding chute.

19. A powered mobile apparatus for moving stakes from the ground as set forth in claim 18, wherein said pair of counterrotating rollers are rubber tires.

20. A powered mobile apparatus for moving stakes from the ground as set forth in claim 19, wherein a first of said rubber tires drives a second of said rubber tires.

21. A powered mobile apparatus for moving stakes from the ground as set forth in claim 18, wherein said stake impeller includes a driven wheel having radially extending impeller arms for impelling said stakes from said tortuous path to said stake receiving passage.

* * * * *